Figure 1A:
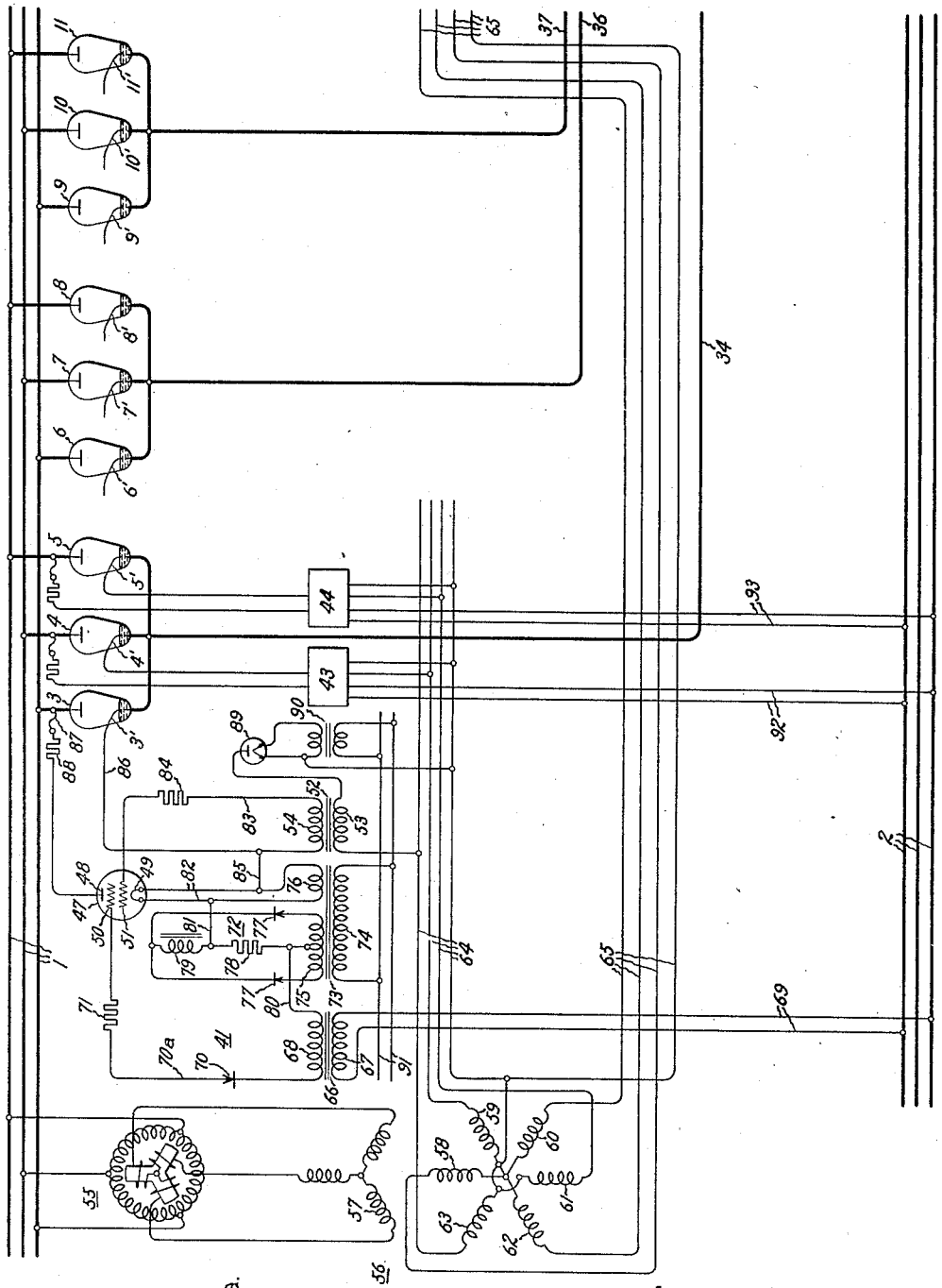

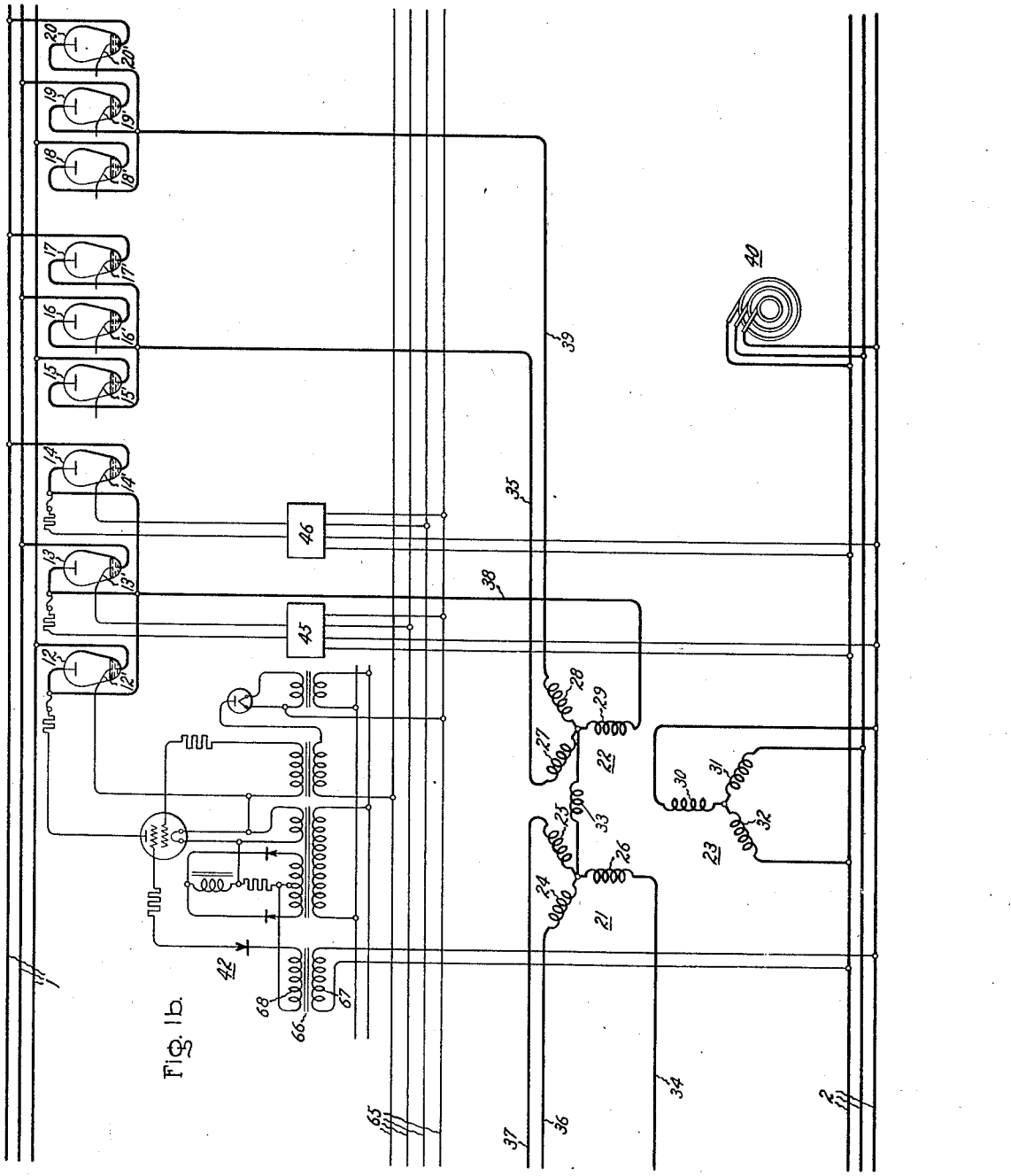

Patented June 15, 1937

2,084,159

UNITED STATES PATENT OFFICE 2,084,159

ELECTRIC VALVE SYSTEM

Albert H. Mittag, Schenectady, N. Y., assignor to General Electric Company, a corporation of New York Application February 29, 1936, Serial No. 66,390

10 Claims. (Cl. 171—97)

My invention relates to an improved electric valve circuit and more particularly to control circuits for translating systems employing electric valves of the gaseous type having immersion-ignitor control members.

Heretofore there have been devised various excitation circuits for controlling the conductivity of electric valves employing immersion-ignitor control members. In many applications it is desirable to provide an excitation circuit which will continuously energize the immersion-ignitor during predetermined periods to assure positive starting and control. Some of these excitation circuits have failed to provide the positive and reliable control necessary for satisfactory operation.

It is an object of my invention to provide an improved electric valve translating system.

It is another object of my invention to provide an improved excitation circuit for electric valves of the gaseous type employing immersion-ignitor control members.

It is a further object of my invention to provide an improved electric valve excitation circuit for controlling the conductivity of electric valve translating apparatus.

In accordance with one embodiment of my invention I provide an improved electric valve translating circuit and excitation circuit therefor for transmitting energy between two electric circuits in response to two different predetermined electrical conditions. In accordance with another feature of my invention I provide an excitation circuit comprising electronic discharge means of the gaseous type for controlling the conductivity of an associated main electric valve of the gaseous type employing immersion-ignitor control member. The excitation circuit is energized from the voltage appearing across the anode and cathode of the main electric valve, the conductivity of which is to be controlled. The excitation circuit comprises an electronic discharge device of the gaseous type employing two control members which cooperate or act conjointly to control the conductivity of the electronic discharge device and hence to control the conductivity of the associated main electric valve. Means are provided for energizing one control electrode of the electronic discharge device in accordance with one electrical condition and means are provided to control the energization of the other control member in accordance with a different electrical condition. A still further feature of my invention is the provision of an improved excitation circuit for electric valves of the gaseous type employing immersion-ignitor control members in which the immersion-ignitor control member is continuously excited or energized during predetermined intervals in which the main electric valve is intended to be conductive, providing thereby a means for assuring positive ignition or control of the main electric valve.

For a better understanding of my invention reference may be had to the following description taken in connection with the accompanying drawings and its scope will be pointed out in the appended claims.

Figs. 1a and 1b of the accompanying drawings, considered together, diagrammatically represent an embodiment of my invention as applied to an electric valve translating circuit for transmitting energy between alternating current circuits of different frequencies.

Referring now to Figs. 1a and 1b of the accompanying drawings, my invention is diagrammatically illustrated as applied to an alternating current electric valve converting system for transmitting energy between two polyphase alternating current circuits 1 and 2 of different frequencies. An electric valve aggregate comprising electric valves 3 to 20, inclusive, having immersion-ignitor control members 3'—20', is employed to transmit energy from the alternating current supply circuit 1 to the alternating current load circuit 2 through a plurality of groups of inductively associated electrical networks comprising networks 21, 22 and 23. The electrical networks 21, 22 and 23 comprise inductively associated phase windings 24—26, 27—29 and 30—32, respectively. Electrical neutral connections of the networks 21 and 22 are connected by an inductive element 33. To supply unidirectional current to the phase windings 24—29, inclusive, from the alternating current circuit 1, the associated electric valves 3—20, inclusive, function to selectively energize these windings in accordance with electrical conditions of the supply circuit 1 and the load circuit 2. For example, the valves 3—5, inclusive, function as a three phase rectifier to supply unidirectional current to the phase winding 26 through a conductor 34, and the valves 15—17, inclusive, serve to return the current through one of the windings of network 22, for example winding 27, through a conductor 35 to circuit 1. In a similar manner, the valves 6—8, inclusive, and 9—11, inclusive, serve to furnish unidirectional current to phase windings 24 and 25 through conductors 36 and 37, respectively. Valves 12—14 and valves 18—20 operate to return the unidirectional current through phase windings 29 and 28 through conductors 38 and 39, respectively. It should be understood that the sequence of energization of the phase windings of networks 21 and 22 may be controlled by controlling the sequence of energization of the various groups of valves associated with the respective phase windings. The circuit 2 is connected to an alternating current generator 40 which maintains the circuit 2 at a substantially constant frequency.

An individual excitation circuit is associated with each of the electric valves 3—20, inclusive. The excitation circuits 41 and 42 for electric valves 3 and 12, respectively, are shown in detail and the excitation circuits for electric valves 4, 5, 13 and 14 are represented by the simplified elements 43—46, respectively. For the purpose of simplifying the drawings and the description thereof, the control circuits for electric valves 6—11 and 15—20, inclusive, have not been shown. It should be understood that excitation circuits, similar to circuit 41, are associated with each of the electric valves 3—20. Each of these excitation circuits, of which circuits 41 and 42 are exemplary, controls the conductivity of the associated main electric valve in accordance with electrical conditions, such as the voltages, of the supply circuit 1 and the load circuit 2. For example, if the circuits 1 and 2 are of different frequencies, the conductivity of each of the electric valves 3—20 will be controlled in accordance with the voltage and hence the frequency of both supply circuit 1 and load circuit 2.

For the purpose of describing the excitation circuits, reference may be had to excitation circuit 41 in particular which is employed to control the conductivity of main valve 3 in accordance with electrical conditions of the supply circuit 1 and the load circuit 2. Excitation circuit 41 comprises an electronic device 47, preferably of the gaseous type, having an anode 48, a cathode 49 and control members 50 and 51 and means responsive to electrical conditions of the supply circuit 1 and the load circuit 2 for conjointly controlling the conductivity of electronic device 47 to effect periodic control of the electric valve 3. To control the electronic device 47 in response to an electrical condition of the supply circuit 1, I employ a transformer 52 having a primary winding 53 and a secondary winding 54 which is energized through any conventional phase shifting arrangement such as the rotary phase shifter 55 and a transformer 56 having primary windings 57 and secondary windings 58—63, inclusive. The excitation circuits for electric valves 3—11 are energized from the three phase system comprising secondary windings 59, 61 and 63 of transformer 56 through conductors 64. The excitation circuits for the oppositely disposed valves 12—20 are energized from secondary windings 58, 60 and 62 of transformer 56 through conductors 65. A transformer 66 having a primary winding 67 and a secondary winding 68 is used to energize the excitation circuit 41 in response to an electrical condition of the load circuit 2. Conductors 69 connect the primary winding 67 of the transformer 66 to one phase of the load circuit 2. Transformer 66 may be of the type for supplying a voltage of peaked wave form.

A voltage which varies in accordance with an electrical condition of load circuit 2 is impressed on control member 50 of electronic device 47 through a unidirectional conducting device such as a contact rectifier 70, a conductor 70a and a current limiting resistance 71. A bi-phase rectifying circuit 72 comprising a transformer 73 having a primary winding 74 and secondary windings 75 and 76, unidirectional conducting devices 77, resistance 78 and an inductance 79, is provided to furnish a negative bias voltage. Winding 76 serves to energize the cathode 49 of electronic device 47. A conductor 80 connects the right-hand terminal of secondary winding 68 of transformer 66 to a lower terminal of resistance 78 and a conductor 81 connects an upper terminal of resistance 78 to the cathode 49 of electronic device 47 through conductors 82.

A voltage which varies in accordance with an electrical condition of the supply circuit 1 is impressed on the control member 51 of device 47 by the secondary winding 54 of transformer 52 through a conductor 83 and a resistance 84. The left-hand terminal of winding 54 is connected to the cathode 49 of electronic device 47 through a conductor 85 and conductors 82 and is also connected to the control member 3' of electric valve 3 through a conductor 86. Excitation circuit 41 is energized in accordance with the voltage appearing across the main electric valve 3 through a current limiting means such as a fuse 87 and a current limiting resistance 88, through which the anode of valve 3 is connected to the anode 48 of electronic device 47. I employ a unidirectional conducting device 89 connected in series with the primary winding 53 of transformer 52 to prevent interchange of energy between the control circuits of the associated valves of the respective groups. Transformer 90 is a cathode heating transformer for device 89. Transformers 52 and 90 are energized from any suitable source of alternating current 91.

Excitation circuits 43 and 44 for electric valves 4 and 5 are connected to the load circuit 2 through conductors 92 and 93 respectively. It will be noted that the excitation circuits 43 and 44 for electric valves 4 and 5 are all energized from the same phase of the load circuit 2. In a similar manner the corresponding circuits of the excitation circuits (not shown) for the other group of electric valves 6—8 will be connected to a different phase of the load circuit 2 and the excitation circuits for the group of valves 9—11 will be connected to a still different phase. The corresponding control circuits for the three groups of oppositely disposed valves 12—14, 15—17, and 18—20 are connected to the load circuit 2 in a similar manner. However, the secondary windings 68 of transformers 66 for the excitation circuits for electric valves 12—20, inclusive, are reversed in polarity relative to the corresponding windings in the excitation circuits for valves 3—11.

In explaining the operation of the electric valve converting system shown in Figs. 1a and 1b, let it be assumed that the frequency of the alternating current supply circuit 1 is greater than the frequency of the load circuit 2 and that the valve system is operating to transmit energy from circuit 1 to circuit 2. The groups of electric valves 3—5, 6—8, and 9—11 operate as three phase rectifiers to supply unidirectional current to phase windings 26, 24 and 25, respectively, in a predetermined sequence and the groups of oppositely disposed electric valves 12—14, 15—17, and 18—20 operate as three rectifiers to return this current through windings 29, 27 and 28, respectively. To energize the phase windings of the electrical networks 21 and 22 in the proper sequence and to obtain the proper phase relation of the voltages induced in the phase windings of network 23, it is essential that the groups of valves associated with the respective phase windings of networks 21 and 22 be rendered conductive in a predetermined sequence and phase relation, corresponding to the voltages of the polyphase load circuit 2. For example, the conductivity of each of the valves of group 3—5 must be controlled in accordance with the voltage of the supply circuit 1 and the voltage of the load circuit 2 to effect periodic energization of the phase winding 26 through conductor 34. This current may be returned through phase winding 27, conductor 35 and the group of valves 15—17. The current in the inductive element 33 is unidirectional and of substantially constant magnitude and comprises a direct current circuit.

The operation of the excitation circuit 41 associated with electric valve 3 controls the conductivity of the valve 3 in accordance with two electrical conditions; that is, it controls the valve in accordance with the voltage of one phase of the supply circuit 1 and in accordance with the voltage of one phase of the load circuit 2. During predetermined half cycles of the potential of the lower frequency circuit 2 and during predetermined positive half cycles of the phase potential of the supply circuit 1, it is desired to transmit current through electric valve 3. The exciting current for valve 3 is controlled by electronic device 47, the conductivity of which is controlled in accordance with electrical conditions of circuits 1 and 2 by means of transformers 52 and 66 respectively. The voltage impressed upon control member 51 of electronic device 47 will be positive during positive half cycles of the alternating potential of the associated phase of circuit 1. This voltage is obtained from circuit 1, phase shifter 55, transformer 56, transformer 52 and is impressed across control member 51 and cathode 49 through resistance 84, conductor 83, winding 54, and conductors 85 and 82. By virtue of the unidirectional conducting device 89 only half cycles of voltage of the control circuit will be impressed upon control member 51. The phase relation of the voltage impressed on control member 51 may, of course, be controlled by means of the rotary phase shifter 55. During half cycles of voltage of predetermined sign of the associated phase of circuit 2, a suitable positive voltage will be impressed upon the control member 50 of electronic device 47 to render the device conductive during those intervals in which suitable potentials are also impressed on the control member 51. The voltage impressed across the control member 50 and cathode 49 of electronic device 47, which is responsive to an electrical condition such as the voltage of load circuit 2, is supplied through a circuit comprising resistance 71, conductor 70a, contact rectifier 70, secondary winding 68 of transformer 66, conductor 80, resistance 78 which furnishes a bias voltage, conductor 81 and conductors 82. By virtue of the contact rectifier 70, the positive half cycles of potential are suppressed and only the negative half cycles of potential are impressed on the control member 50 of electronic device 47. During the period in which negative voltages are impressed on the control member 50, the electronic device 47 is maintained non-conductive if this voltage is sufficiently negative to render the control member 51 ineffective. This arrangement for controlling an electronic device of the gaseous type employing two control members is disclosed and broadly claimed in a copending application of Joseph H. Foley, Serial No. 66,380 filed February 29, 1936 and assigned to the assignee of the present application. The control members 50 and 51 of electronic device 47, therefore, are arranged in cooperative relation to control conjointly the conductivity of this device. Under predetermined electrical conditions, as for example voltages of proper polarity of supply circuit 1 and load circuit 2, the electronic device 47 will be rendered conductive during the intervals of predetermined concurrent agreement between these conditions by the cooperative relationship of the control members 50 and 51 to effect energization of the excitation circuit 41 for electric valve 3. Since the electronic device 47 is energized in response to the voltage appearing across the anode and cathode of electric valve 3, a suitable excitation current will flow through the excitation circuit 41 to render the electric valve 3 conductive when the device 47 is conductive. The circuit through which this excitation current flows comprises fuse 87, resistance 88, electronic device 47, conductors 82, conductor 85, conductor 86, control member and cathode for electric valve 3.

In connection with the embodiment of my invention diagrammatically shown in Figs. 1a and 1b, since the respective excitation circuits are energized in response to a voltage of relatively higher frequency than the load circuit 2, it should be understood that in the event the immersion-ignitor control members fail to initiate an electrical discharge in response to the first current transferred through the control members, the excitation circuits inherently function to supply subsequent energization currents to the control members where the frequency of the supply circuit is greater than the frequency of the load circuit. For example, if the frequency of the alternating current supply circuit is three times that of the alternating current load circuit, these circuits will supply three separate impulses of excitation current to the immersion-ignitor control member to assure positive ignition of the electric valve. Furthermore, since these excitation circuits are energized in accordance with the voltage appearing between the anodes and cathodes of the associated main electric valves, in the event the electric valves fail to become conductive immediately the excitation current for the immersion-ignitor control members will be maintained during the entire positive half cycle or a considerable portion of the positive half cycle of the potential of the supply circuits, depending upon the relative phase relationship between the voltage impressed upon the control members and the time of energization of the immersion-ignitor by the respective excitation circuits.

Although the various embodiments of my invention have been diagrammatically shown as applied to controlling the conductivity of electric valves employing control members of the immersion-ignitor type, it should be understood that my invention in its broader aspects applies to electric valves generally.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. An excitation circuit for an electric valve of the gaseous type having an anode, a cathode and a control member comprising an electronic discharge means energized in accordance with the voltage appearing across said anode and cathode of said electric valve, and means for controlling the conductivity of said electronic discharge means to energize said control member in accordance with two different predetermined electrical conditions.

2. In combination, a supply circuit, a load circuit, electric translating apparatus connected therebetween comprising an electric valve having an anode, a cathode and an immersion-ignitor control member and being arranged to be conductive during predetermined intervals established by predetermined electrical conditions of said circuits, and an excitation circuit energized in accordance with the voltage appearing across said anode and said cathode comprising an electronic discharge device of the gaseous type for continuously energizing said immersion-ignitor during said intervals until said electric valve is rendered conductive.

3. In combination, a supply circuit, a load circuit, electric translating apparatus interconnecting said circuits comprising an electric valve of the gaseous type having an anode, a cathode and an immersion-ignitor control member, an excitation circuit energized in accordance with the voltage appearing across said anode and said cathode of said electric valve comprising an electronic discharge device of the gaseous type having an anode, a cathode and at least two control members, and means for energizing said control members in accordance with different predetermined electrical conditions of said supply circuit and said load circuit.

4. In combination, an alternating current supply circuit, an alternating current load circuit, electric translating apparatus interconnecting said circuits comprising an electric valve of the gaseous type having an anode, a cathode and an immersion-ignitor control member, and an excitation circuit energized in accordance with the voltage appearing between said anode and said cathode of said electric valve for supplying current to said immersion-ignitor control member during predetermined positive half cycles of potential impressed between said anode and said cathode until said valve becomes conductive comprising an electronic discharge device of the gaseous type having at least two control members, means for energizing one of said control members in accordance with the voltage of said supply circuit and means for energizing the other of said control members in accordance with the voltage of said load circuit.

5. In combination, an alternating current supply circuit, an alternating current load circuit, electric translating apparatus interconnecting said circuits comprising a plurality of inductive windings and a plurality of electric valve means each having an anode, a cathode and an immersion-ignitor control member for connecting said inductive windings to said supply circuit, and a plurality of excitation circuits each associated with a predetermined one of said electric valve means and each being connected across the anode and cathode of said associated electric valve means comprising an electronic discharge device having two control members, means for energizing one of said control members in accordance with an electrical condition of said supply circuit and means for energizing the other of said control members in accordance with an electrical condition of said windings.

6. In combination, an alternating current supply circuit, an alternating current load circuit, electric translating apparatus including a pair of inductive networks each having a plurality of phase windings and an electrical neutral, an interconnection between said electrical neutrals, and a plurality of electric valve means of the gaseous type having an anode, a cathode and an immersion-ignitor control member associated with each of said phase windings, and a plurality of excitation circuits each energized in accordance with the voltage appearing between the anode and cathode of said associated electric valve means for periodically controlling the conductivity of said electric valve means to effect energization of said phase windings in a predetermined sequence comprising an electronic discharge device of the gaseous type having two control members, means for energizing one of said control members in accordance with the voltage of said supply circuit and means for energizing the other of said control members in accordance with the voltage of said load circuit.

7. In combination, a supply circuit, a load circuit, an electric valve means comprising an anode, a cathode and a control member of the immersion-ignitor type interconnecting said circuits, and an excitation circuit energized in accordance with the potential appearing across said anode and said cathode of said electric valve means for controlling the conductivity of said electric valve means comprising an electronic discharge device including an anode, a cathode and at least two control members, means associated with said load circuit and connected to one of said control members of said electronic discharge device tending to render said device conductive in accordance with a predetermined electrical condition of said load circuit and means associated with said supply circuit and connected to the other of said control members of said electronic discharge device for rendering said device conductive in accordance with a predetermined electrical condition of said supply circuit and in accordance with said predetermined electrical condition of said load circuit.

8. In combination, an alternating current supply circuit, an alternating current load circuit, electric valve means including an anode, a cathode and a control member of the immersion-ignitor type interconnecting said circuits, and an excitation circuit energized in accordance with the potential appearing across said anode and said cathode of said electric valve means for controlling the conductivity of said electric valve means in accordance with predetermined electrical conditions of said supply circuit and said load circuit comprising an electronic discharge device of the gaseous type including an anode, a cathode and two control members, means associated with said load circuit for impressing upon said control member of said electronic discharge device a potential tending to render said electronic discharge device conductive during predetermined portions of the cycle of alternating potential of said load circuit and means associated with said supply circuit for impressing upon the other of said control members of said electronic discharge device a potential for rendering said electronic device conductive during predetermined portions of the cycle of alternating potential of said supply circuit and in accordance with said predetermined portions of the cycle of alternating potential of said load circuit.

9. An electric valve converting system for transmitting energy between alternating current circuits of different frequencies comprising a pair of inductively associated networks each network including a group of phase windings and having an electrical neutral, a connection between said electrical neutrals, electric valve means connecting each of said phase winding of one of said networks to one of said alternating current circuits, electric valve means for connecting each of said phase windings of the other of said networks to said one of said alternating current circuits in a sense opposite to that of said first-mentioned electric valve means, and an electronic discharge means energized in accordance with the voltage appearing across an anode and cathode of said electric valve means for controlling the conductivity of said electric valve means conjointly in accordance with the frequencies of said circuits.

10. In combination, a polyphase alternating current supply circuit, a polyphase alternating current load circuit, groups of inductively associated electrical networks for interconnecting said circuits, a pair of said electrical networks each being provided with a plurality of phase windings and each having an electrical neutral, a connection between said electrical neutrals, electric valve means for connecting said phase windings of one of said electrical networks to said supply circuit for transmitting unidirectional current to said phase windings in a predetermined sequence, electric valve means for connecting each of said phase windings of the other of said electrical networks to said supply circuit in a sense opposite to that of said first-mentioned valve means for transmitting said current through said phase windings of said second mentioned network in a predetermined sequence, and electronic discharge means energized in accordance with the voltage across an anode and cathode of said electric valve means for controlling the conductivity of said electric valve means conjointly in accordance with the voltage of said supply circuit and in accordance with the voltage of said phase windings.

ALBERT H. MITTAG.

DISCLAIMER 2,084,159.—*Albert H. Mittag*, Schenectady, N. Y. ELECTRIC VALVE SYSTEM. Patent dated June 15, 1937. Disclaimer filed June 15, 1939, by the assignee, *General Electric Company*.

Hereby enters this disclaimer to claim 1 of said patent.

[*Official Gazette July 11, 1939.*]